United States Patent
Wagner

(10) Patent No.: US 9,791,560 B2
(45) Date of Patent: Oct. 17, 2017

(54) RADAR SIGNAL PROCESSOR, RADAR SYSTEM AND METHOD FOR MONITORING A FUNCTIONAL SAFETY OF A RADAR SYSTEM

(71) Applicant: Infineon Technologies AG, Neubiberg (DE)

(72) Inventor: Christoph Wagner, Enns (AT)

(73) Assignee: Infineon Technologies AG, Neubiberg (DE)

( * ) Notice: Subject to any disclaimer, the term of this patent is extended or adjusted under 35 U.S.C. 154(b) by 565 days.

(21) Appl. No.: 14/458,325

(22) Filed: Aug. 13, 2014

(65) Prior Publication Data

US 2016/0047908 A1    Feb. 18, 2016

(51) Int. Cl.
G01S 13/02    (2006.01)
G01S 7/40    (2006.01)
G01S 13/93    (2006.01)
G01S 7/35    (2006.01)
G01S 13/34    (2006.01)

(52) U.S. Cl.
CPC .......... *G01S 13/0209* (2013.01); *G01S 7/352* (2013.01); *G01S 7/40* (2013.01); *G01S 13/34* (2013.01); *G01S 13/931* (2013.01)

(58) Field of Classification Search
CPC ........ G01S 13/0209; G01S 7/352; G01S 7/40; G01S 13/34; G01S 13/931
See application file for complete search history.

(56) References Cited

U.S. PATENT DOCUMENTS

| | | | | |
|---|---|---|---|---|
| 3,710,383 A | * | 1/1973 | Cherry | B60K 31/0008 342/455 |
| 3,882,413 A | * | 5/1975 | Healey, III | H03L 7/04 331/12 |
| 4,589,135 A | * | 5/1986 | Baker | H03H 11/1217 381/100 |
| 5,646,625 A | | 7/1997 | Burrier | |
| 6,373,427 B1 | * | 4/2002 | Hohne | G01S 7/354 342/128 |
| 2009/0276542 A1 | * | 11/2009 | Aweya | H04J 3/0667 709/248 |
| 2010/0106356 A1 | * | 4/2010 | Trepagnier | G01S 17/023 701/25 |

(Continued)

FOREIGN PATENT DOCUMENTS

CN    1149788 A    5/1997
CN    1906499 A    1/2007

(Continued)

OTHER PUBLICATIONS

"Lead-Lag Compensator", Wikipedia, May 28, 2011, https://web.archive.org/web/20110528001349/http://en.wikipedia.org/wiki/Lead%E2%80%93lag_compensator, retrieved Feb. 28, 2017.*

(Continued)

*Primary Examiner* — Peter Bythrow
(74) *Attorney, Agent, or Firm* — Eschweiler & Potashnik, LLC

(57) ABSTRACT

A radar signal processor includes a baseband signal generator, which generates a baseband signal based on information from a received radar signal and a Lead-Lag filter, which filters the baseband signal to generate a filtered signal.

18 Claims, 4 Drawing Sheets

(56) References Cited

U.S. PATENT DOCUMENTS

| | | | | |
|---|---|---|---|---|
| 2011/0057829 | A1* | 3/2011 | Yuanzhu | G01S 13/34 342/28 |
| 2012/0170699 | A1* | 7/2012 | Fischette | H03D 3/24 375/376 |
| 2016/0191000 | A1* | 6/2016 | Takahama | G01R 19/16509 330/298 |

FOREIGN PATENT DOCUMENTS

| | | |
|---|---|---|
| CN | 102866387 A | 1/2013 |
| CN | 102437834 A | 5/2015 |

OTHER PUBLICATIONS

Sivers Ima. "FMCW Radar Sensors—Application Notes." Sivers Ima AB, Sweden. Jun. 2011.

* cited by examiner

RADAR SIGNAL PROCESSOR, RADAR SYSTEM AND METHOD FOR MONITORING A FUNCTIONAL SAFETY OF A RADAR SYSTEM

FIELD

Embodiments relate to measures for attenuating undesired high amplitudes in a low frequency range and in particular to a radar signal processor, a method for monitoring a functional safety of a radar system and a radar system for FMCW radar.

BACKGROUND

For some radar systems, close-in targets and unwanted reflections within the radar sensor result in high signal components at low baseband frequencies. These high signal components may limit the maximum applicable gain that can be facilitated in the further baseband signal processing. It is desired to adapt these signal components to allow an ordinary amplifying.

SUMMARY

An embodiment relates to a radar signal processor comprising a baseband signal generator, which generates a baseband signal based on information from a received radar signal and a Lead-Lag filter, which filters the baseband signal to generate a filtered signal.

By implementing a Lead-Lag filter, the baseband signal may be adapted to have suitable signal strengths in all frequency ranges. This allows analyzing of low frequency signals, which may indicate close objects, as well as high frequency signals, which may indicate distant objects. In addition monitoring the functional safety is possible.

According to an embodiment a method a baseband signal having information on a distance of an object is received. The baseband signal is filtered to generate a filtered signal. Information on safe operation conditions of the radar system are determined using a DC component of the filtered signal.

According to an embodiment a radar system for a FMCW radar for measuring a distance of at least one object comprises a sender for generating a sent radar signal, a receiver for receiving a reflected radar signal, a baseband signal generator, which generates a baseband signal based on the sent radar signal and the received radar signal and a Lead-Lag filter, which filters the baseband signal to generate a filtered signal.

BRIEF DESCRIPTION OF THE DRAWINGS

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
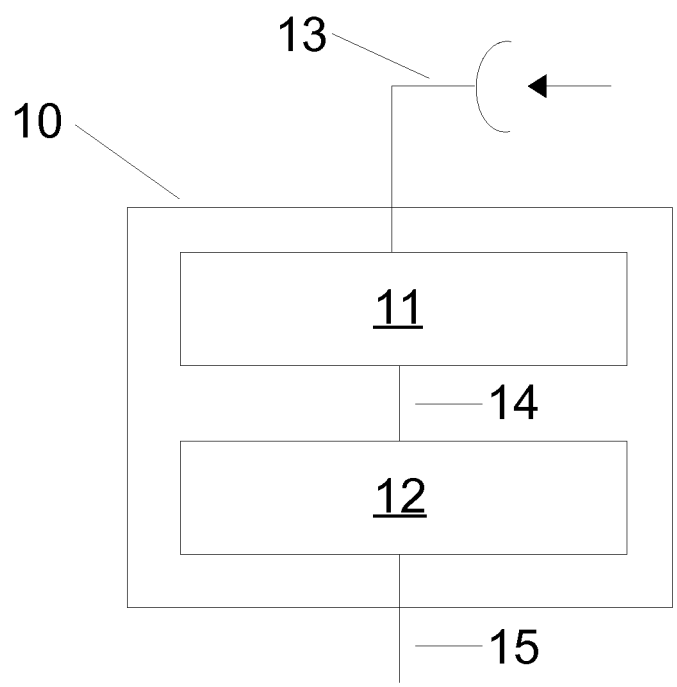
FIG. 1 shows a block diagram of a radar signal processor.

FIG. 1 shows a block diagram of a radar signal processor according to an embodiment.

The radar signal processor 10 comprises a baseband signal generator 11, which generates a baseband signal 14 based on an information from a received radar signal 13 and a Lead-Lag filter 12, which filters the baseband signal 14 to generate a filtered signal 15.

A radar system is a device or comprises multiple devices or units, which are (in combination) capable to perform a measurement based on transmitting radar waves. Such a system may comprise several units like a radar signal generation unit (like an oscillator), a sending unit (like an antenna), a receiving unit (to receive a radar signal from the sending unit, usually after it was reflected by an object outside of the radar system) and a radar signal processing unit (to extract the wanted data) and optionally further evaluation.

The different units may be integrated in few or even one component. Further the sending and receiving unit may be located separate, dependent to the working principle of the radar system.

Typical parameters, which are measured by radar systems, may comprise e.g. the number, distances or movements (direction and speed) of objects, which are in a distance apart from the radar system.

Objects may comprise fixed or moving objects or physically any substance which reflects the radar waves in a way the radar system may detect the reflected radar wave. This may also include natural objects like the ground, mountains, vegetation, soil or other obstacles.

A radar signal processor (or processing unit) may be a part of a radar system, which processes information coming from a received radar signal in any form. An incoming radar wave may cause an electrical signal (usually an AC signal having electrical parameters like a (time shifting) frequency and voltage), when received by the receiving unit. This electrical signal may be optionally preprocessed and is forwarded to the baseband signal generator, which alters the signal in a way that it is transformed into the baseband.

This electrical signal may have some parameters (e.g. frequency) which are the same for the incoming radar wave. The frequency may be close to the high carrier frequency, which was used to generate the sent radar signal. Such signals are modulated with the carrier frequency and therefore the signal has to be processed or demodulated to get the wanted signal or information. One measure is to use a baseband signal generator to transfer the high carrier frequency band to a low baseband which may be easier to process electrically or the information may be derived easier.

Unwanted reflections may occur especially on appearance of close-in targets (objects with a close distance to the radar system), when the output of the baseband signal generator may result in a signal with high signal components (amplitude) at low intermediate frequency (IF) or baseband frequencies. Depending on the application, the definition of a close distance might be different, e.g. for automotive applications up to 1 meter, 2 meters or 5 meters.

Dependent on the type of the baseband signal generator, an intermediate frequency may be the output instead the final baseband signal. E.g. in case of a generator, which works in several steps, a frequency shift from a high carrier frequency range to a middle intermediate frequency range may happen first, before the signal is transformed to the baseband frequency range. In such a case, where the filter that filters the baseband signal (e.g. Lead-Lag filter) is designed or connected to filter the intermediate frequency, a filtered signal based on the intermediate signal may be the according output instead the baseband signal. Optionally an additional filter may filter the final baseband signal after a previous filtering of the intermediate frequency.

A possible filter type, which may be used to suppress unwanted low frequency peaks with high amplitudes, is a high-pass filter. Such a filter suppresses low frequency components (also called DC-component) completely, in a way that desired information within this component may be lost. A DC-component may e.g. include the frequency range below 1%, 5% or 10% of the signal bandwidth (of the baseband) or of frequencies below 1, 10, 100 or 1000 kHz.

On the other hand, without a filter, these high amplitude signal DC-component would be able to limit the maximum applicable gain that can be facilitated in the further IF/baseband signal processing, because a high gain could lead the following amplifier into saturation. This would be due to the high amplitudes at the low frequencies, which are amplified with a factor and drive the amplifier into saturation, while the high frequency component might be insufficiently amplified. This may prevent a sufficient gain for the higher frequencies (which may indicate objects/targets, which are further away and often contain the most important information).

A Lead-Lag filter may be used to filter the baseband signal to generate a filtered signal.

Figure 2A:
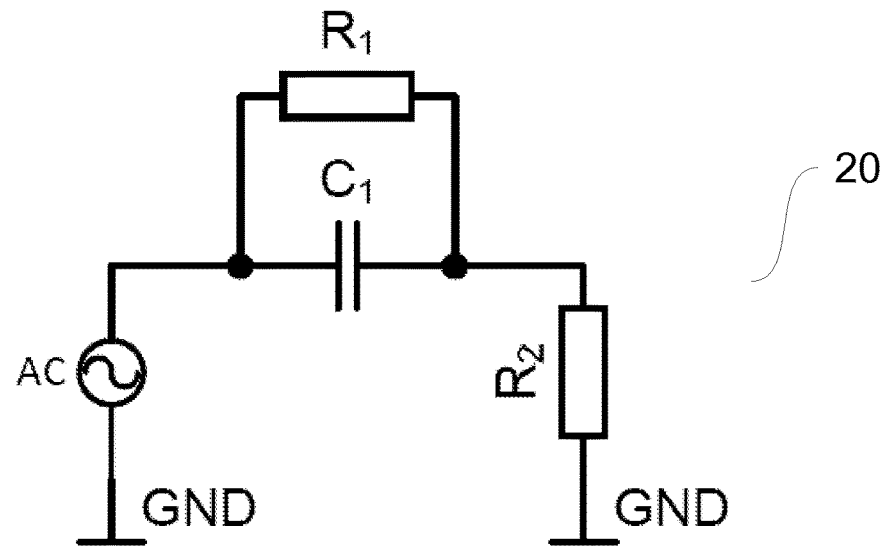
FIG. 2A shows an electric circuitry which implements a Lead-Lag filter.

FIG. 2a shows an example of an electric circuitry 20 which implements a Lead-Lag filter. An AC input signal AC, like the baseband signal is connected to a typical high-pass arrangement with a capacitor C1 and resistor R2. Beyond the high-pass layout, a resistor R1 is added, which is connected in parallel to the capacitor and thus forms a Lead-Lag filter. On display is also a connection to ground GND. For low frequency/DC signal components the two resistors form a voltage divider.

Figure 2B:
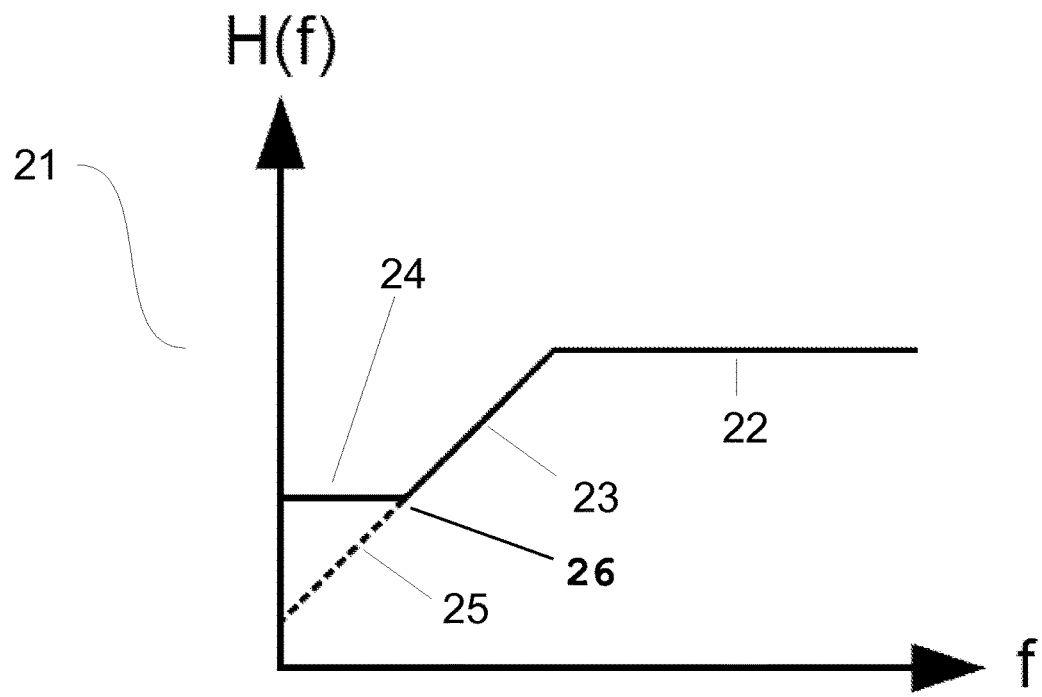
FIG. 2B shows a characteristic curve of the Lead-Lag filter.

FIG. 2b shows a characteristic curve 21 of the Lead-Lag filter 20. A filtered amplitude H(f) depends on the frequency f of the input signal, e.g. the baseband signal. It is partly similar to a high-pass filter with a high transmittance for high frequencies 22, an edge or first corner frequency 23 with an attenuation of 3 dB as compared to the unfiltered signal, corresponding to a scaling of the amplitude by $1/\sqrt{2}$. A high-pass or Lead-Lag filter provides signal attenuation at frequencies below its cutoff or first corner frequency while maintaining essentially unmodified signal properties in a band of wanted signal frequencies at higher frequencies.

A typical high-pass filter would steadily increase its attenuation 25 for lower frequencies 25. In contrast thereto the Lead-Lag filter has steady/constant attenuation for low frequencies 24 and for the DC-component 24. The Lead-Lag filter thus may provide a certain transmittance for these frequencies introducing a finite DC suppression in contrast to a high-pass filter with an infinite suppression, while essentially constantly reducing low-frequency signal components in terms of signal amplitude. The Lead-Lag filter may therefore be characterized by means of a second corner frequency 26. Below the second corner frequency 26, the attenuation of the Lead-Lag filter may be approximated or characterized as being nearly constant. The second corner frequency may, hence, be defined to be the frequency where a tangent to the slope of the high pass characteristic of the lead lag filter reaches the value of constant DC suppression. According to some embodiments, the tangent is built through the turning point of the filter characteristic to determine the second corner frequency 26. Due to this characteristic, frequencies below the second corner frequency may be denoted as DC-component when referring to the filter characteristics herein. DC-component may hence be used synonymous for a frequency range starting at 0 Hz and ending at a predetermined upper frequency, e.g. the second corner frequency 26.

According to some embodiments, the first corner frequency is within the interval starting at 1% and ending at 20% of the bandwidth of the baseband signal. Hence, the signal amplitude may be attenuated between 1% and 20% of the bandwidth. According to some embodiments, the first corner frequency is within the interval starting at 5% and ending at 15% of the bandwidth of the baseband signal and according to further embodiments, the first corner frequency is within the interval starting at 8% and ending at 12% of the bandwidth of the baseband signal.

According to some embodiments, the second corner frequency is within the interval starting at 1% and ending at 50% of the first corner frequency. Hence, the signal amplitude may be constantly attenuated below a frequency depending on the first corner frequency. According to some embodiments, the second corner frequency is within the interval starting at 3% and ending at 35% of the bandwidth of the baseband signal and according to further embodiments, the first corner frequency is within the interval starting at 5% and ending at 15% of the bandwidth of the baseband signal to provide appropriate filter characteristics.

According to some embodiments, the first corner frequency and the second corner frequency are adjustable to dynamically adapt the characteristic to the requirements. Radar signal device according to claim 7, wherein the first corner frequency and the second corner frequency are adjusted based on a property of the filtered signal. This may, for example, allow to increase an amplification gain of a subsequent amplifier for the filtered signal when an attenuation by means of the Lead-Lag filter is increased.

In radar applications, the information about close objects is still available in the filtered signal after the filtering by a Lead-Lag filter and may be evaluated. A high-pass filter tends to suppress this information completely.

The Lead-Lag filter may allow attenuating high signal components at low IF/baseband frequencies caused e.g. by close-in targets and even unwanted reflections within the sensor or radar system itself. Amplifying this filtered signal may then be possible with a sufficient gain to amplify the high frequency signals to a desired strength or amplitude.

Further a very high dynamic range which may be required for typical IF or baseband processing chains may be implemented this way.

A so called range compression may be performed by choosing an appropriate corner frequency which lies within the useable spectrum.

In an embodiment of the radar signal processor the baseband signal generator generates the baseband signal by mixing information based on a sent radar signal with the information from the received radar signal. The received radar signal is the reflected radar signal of the sent radar signal.

The information based on a sent (or transmitted) radar signal may be an electrical signal, which is used to produce the radar signal, e.g. the radar signal wave, e.g. by using an antenna. This electrical signal may be generated by an oscillator, which may be located local, i.e. close or within the radar system or e.g. on an integrated component. The sending and/or receiving and/or radar signal processor unit or all of them may be integrated within one single component or in different component connected via interfaces, which may be electrical connections in the simplest form. So the electrical signal consists or comprises the information from the sent radar signal vice versa for the sent radar signal, dependent on the point of view.

On the one hand, an oscillator may generate an electrical signal which may generate a radar wave (sent radar signal), e.g. by using an antenna. Thus, the information (like voltage, frequency and other parameters) may be used for generating the sent radar signal.

On the other hand, by generating the sent radar signal in such a defined way, its electrical parameters are known and they are part of the information, which lies within the electrical signal. Thus, the information based on a sent radar signal also comprises information from (or about) the sent radar signal.

This radar signal is called the sent radar signal although the use of the past tense may not always be appropriate.

An oscillator may provide the electrical signal for generating the sent radar signal. At that moment it would be the sending radar signal or the radar signal which is to be sent.

At a moment of time, the oscillator provides a signal, which is sent at the same moment and is additionally input in a mixing unit, which mixes this oscillator signal, i.e. information based on a sent radar signal with a signal from a received radar signal, at that moment. This received signal at that moment is usually a reflected signal from a sent radar signal, which was not sent at that same moment, but earlier, due to the runtime (at the speed of light) of the radar signal from sending to receiving.

So one radar signal is sent in the same moment when another radar signal is received, but the latter is caused by an earlier sent radar signal. In case the term radar signal is meant to be time continuous, the same would apply for one infinitesimal time frame of a radar signal (which would have a single frequency for the sent, the received and the cause of the received radar signal).

The appearance (and measurement) of a reflection may provide information of the existence of an object, which happens if an echo radar signal is existent, which usually has a much weaker signal strength (amplitude) than the sent signal. The information which lies within the reflected (echo) radar signal, which is to be received by the radar system or sensor, may e.g. comprise signal strength (voltage), phase shift, frequency or frequency spectrum. Ideally a parameter is evaluated, which is not affected by the different amplitudes (signal strengths) unless the received signal is amplified accordingly.

Mixing (e.g. frequency mixing) is a technical method to provide the transformation from the carrier frequency band to the baseband, which is performed by the baseband signal generator.

In an aspect, the radar signal processor is used in a CW-radar system (continuous wave). A CW-radar is sending a radar signal during (usually the whole) duration of the measurement. This may be opposite to e.g. a pulse radar. There are unmodulated CW-radars, where the frequency of the sent radar signal is usually constant and/or the amplitude is usually constant.

Further, the frequency of the reflected radar signal may provide information about the speed (and possibly acceleration, if measured over time) of the object relatively to the movement or speed of the radar system. The according physical effect which caused the deviation in frequency is the so called Doppler-effect. Unmodulated CW-radar systems may possibly not be the best choice for detecting the distance of objects, although measuring a slight change in distance changes is possible. The usage of a double CW-radar with slightly different modulation frequencies may also be capable of measuring distances. Nevertheless usually only changes in the distance may be measured.

To measure the distance directly, a modulated sent radar signal may be used, whereby frequency-, phase-, amplitude- or noise-modulation may be used. The modulation may be periodically and may have to be exactly time linear.

In an aspect, the radar signal processor is used in a FMCW-radar system (frequency modulated continuous wave). In contrast to a CW-radar, a FMCW-radar modulates its sent radar signal by changing the frequency over time (periodic frequency modulation) usually cyclic. The transmitter frequency may be modulated in different ways, like sinusoidal, sawtooth, triangle, square or frequency shift keying, whereby sawtooth may be the most commonly used.

The base principle is that the sent radar signal varies up and down in frequency over a fixed period of time (cyclic). A frequency difference between the sent and received radar signal increases with the delay due to the runtime of the radar wave (to the reflecting object and back to the receiving antenna), which is linear to the distance of the reflecting object from the radar system.

In other words, if a radar signal is received, the received frequency indicates the time span since sending the radar signal with the same frequency. The runtime of the radar signal may be derived from the knowledge of the moment when the measured frequency was originally sent and the signal with this (the same) frequency was received.

For measuring distances additional to movements/speeds, specific modulations may be required.

In an embodiment of the radar signal processor a frequency mixer is configured to mix the information from the sent radar signal and the information from the received radar signal. Frequency mixers may be used to shift signal within certain frequency bands to different frequency bands. For example they can be used for modulation to a high frequency band, which might be suitable to be transmitted by radio waves. The other way round, they can be used to shift high frequency bands to lower frequencies, which are more suitable for further signal processing, like demodulation, amplification and filtering. Basically there are different types of frequency mixers, working by an additive or multiplicative principle and an arbitrary mixer type may be used.

Such a frequency mixer may have information from the sent radar signal (e.g. the electrical signal generated by the oscillator) and information from the received radar signal (e.g. the electrical signal generated by the (antenna of the) received radar signal). Usually the strength or amplitude of the received radar signal is (much) weaker than the sent radar signal.

The capabilities of a mixer are often such that an amplification of the received radar signal is not necessary, as the mixer performs transformations related to the frequency parameters which are not influenced by the amplitude. An exception may be the influence of noise which may be higher for low amplitude signals.

In an aspect, the mixer may be a direct-conversion-receiver (homodyne), which uses an oscillator frequency, whose frequency is close to the carrier frequency (medium frequency of the radar signal). Thus, a demodulation is performed directly into the baseband without using an intermediate frequency.

In an aspect, the mixer may be arranged as a downmixer, where the high frequency signal (received radar signal) is mixed with the local oscillator signal (usually the same oscillator which generates the signal for the sent radar signal).

In an aspect, a superheterodyne receiver may be used instead of a (single) downmixer, which generates the baseband signal via mixing in (at least) two steps to an intermediate frequency (IF) first. A local oscillator signal (which is not necessarily the same to generate the sent radar signal) may be mixed with the received (and optionally prefiltered) radar signal to this intermediate frequency (usually lower than the carrier frequency), which can often be processed much easier than a carrier frequency signal.

The intermediate frequency may be appropriately processed, e.g. amplified and/or filtered, e.g. also with the proposed Lead-Lag filter.

An additional downmixing or demodulation of the intermediate frequency signal can generate the baseband signal or original/demodulated/useful/plain/wished signal.

The proposed Lead-Lag filter may be used after this final demodulation or at any intermediate step or both.

Dependent on the mixer type, the term intermediate frequency may be simultaneous with the baseband frequency (or their middle frequency and spectrum), e.g. for a single downmixer, where physically no IF is generated.

Figure 3:
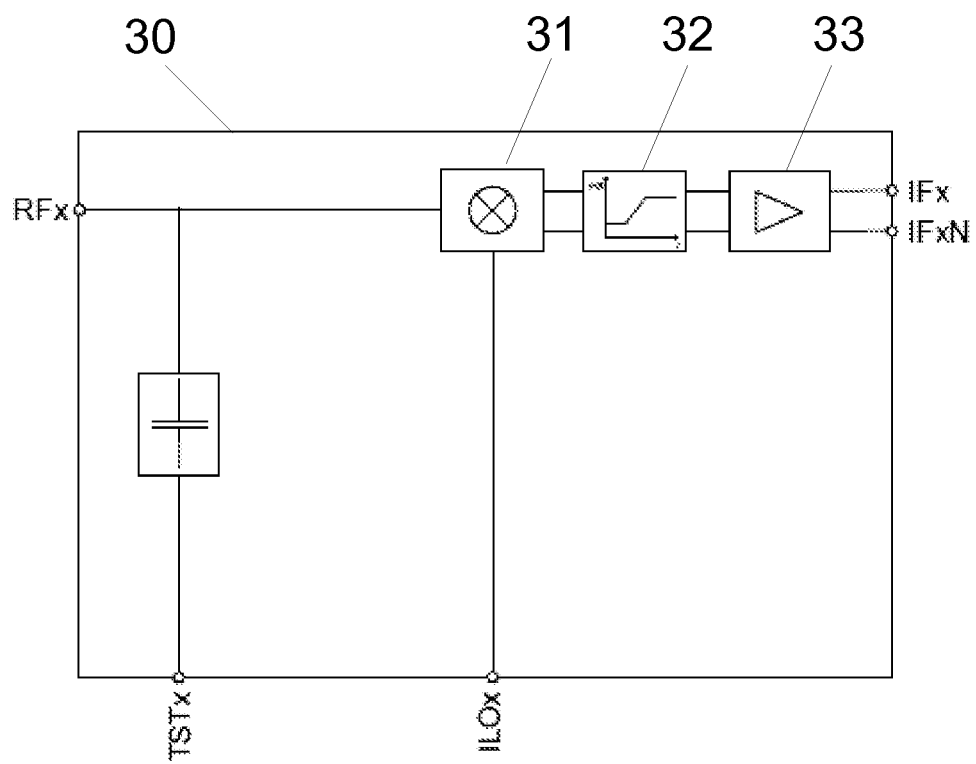
FIG. 3 shows a block diagram of a transceiving radar module.

FIG. 3 shows an example of a block diagram of a transceiving radar module 30 with a receiving frequency input RFx for the received radar signal, an optional test input TSTx and an input for a local oscillator signal ILOx (which may also generate the sent radar signal). Here the radar signal processor comprises a baseband signal generator, e.g. a downmixer 31 and a Lead-Lag filter 32. After that, an amplifier 33 amplifies the filtered signal and provides a baseband or intermediate frequency IFx (or inverted IFxN).

Multiple transceiver modules may be integrated within a radar system or within one component or even on one integrated circuit. This may lead to a redundant system or the possibility to measure several parameters simultaneously, e.g. observing different directions.

In an embodiment of a radar signal processor, a corner frequency of the Lead-Lag filter is configured such that a signal amplitude is attenuated within 8 to 12% of a frequency range of the baseband signal.

The corner frequency of the Lead-Lag filter may be configured to reduce the signal amplitude for roughly 10% of the wanted signal frequency range. For example, the corner frequency is set to 1 MHz, which equates to 10% compared to the 10 MHz total signal bandwidth as defined by a (additional) low-pass filter (slope on the right in FIG. 4).

For example, a carrier frequency may be 77 GHz, the bandwidth 20 MHz, optionally up to 100 MHz. A deviation of the values by less than 20% or 10% or 5% of the mentioned values is possible.

Such a dimensioning of the filter may provide a suitable filter for planned or existing components with approved parameters and configurations. As a general rule, to have the DC suppression in the lower 10% of the bandwidth of the radar system may have proved to be a suitable dimensioning. In other words from the usage point of view, reflections from a distance with less than 10% of the maximum radar range are taken into account as close-in reflections which lie within the DC suppression (assumed the relation between baseband signal and distance is linear).

In an embodiment of the radar signal processor, the Lead-Lag filter has a first corner frequency between 0.8 and 1.2 MHz and a second corner frequency or suppression frequency between 80 and 120 kHz.

In case of a Lead-Lag filter, the DC suppression is not infinite as it would result from a pure high-pass characteristic. Additionally to a first corner frequency of 1 MHz, a second corner frequency is defined at which the reduction of the signal amplitude is turned into a constant suppression. This second corner frequency may be 100 kHz in the example in FIG. 4. A deviation of the values by less than 20% or 10% or 5% of the mentioned values is possible.

Such a dimensioning may again provide a suitable filter for specific hardware and/or applications.

In an embodiment of the radar signal processor, the baseband signal is an analog electrical signal and the Lead-Lag filter is designed to filter the analog electrical signal.

The Lead-Lag filter may be located within the analog signal path, e.g. in after the baseband signal generator (e.g. mixer) and before an ADC.

Because this type of filtering reduces the dynamic within the baseband, by attenuating the high peak signals, the succeeding ADC does not need to have such a large dynamic range as it would have to have it if no Lead-Lag filter is used. The same quantization of the signal may now be provided with a lower resolution of the ADC. This may reduce costs and electrical circuitry effort.

In an embodiment of the radar signal processor, the baseband signal is a digital electrical signal and the Lead-Lag filter is designed to filter the digital electrical signal.

Another option is to locate the Lead-Lag filter after the baseband generator and after an ADC (which is thus located in between). Thus, the ADC has to serve the whole dynamic range required by the unfiltered baseband signal, because it does not result in reduction or required dynamic range for the analog baseband processing stages.

A digital filter design provides signal attenuation in a digital baseband instead of an analog baseband. Testing a filter e.g. for filter design purposes may be facilitated. Further if the following processing is performed digital, the filter may be implemented by the available digital resources.

In an embodiment of the radar signal processor, the Lead-Lag filter is a digital IIR or FIR filter.

An option to implement the Lead-Lag filter functionality would be to implement an IIR (infinite impulse response) or FIR (finite impulse response) filter.

In an embodiment the radar signal processor further comprises an amplifier configured to amplify the filtered signal.

Because the reflected or received radar signal is usually much weaker than the one which was sent, amplification may be requested to gain a signal strength, which facilitates further signal processing.

The amplification in the subsequent analog baseband processing step may be increased by the same amount like the low frequency signal amplitude reduction without degrading linearity or available dynamic range.

The amplitude linearity after the filter may be attenuated, but this must not be taken into account because usually the frequencies are evaluated.

In an embodiment of the radar signal processor, the amplification is at least 18 dB. In another example, the amplification gain may be 20 dB due to the low frequency signal amplitude reduction of 20 dB. A deviation of the values by less than 20% or 10% or 5% of the mentioned values is possible.

Figure 4:
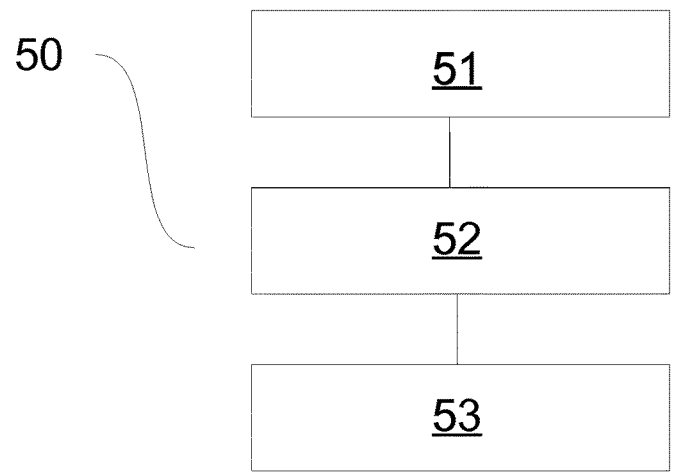
FIG. 4 shows a flow diagram of a method for monitoring a functional safety of a radar system.

FIG. 4 shows a flow diagram of a method for monitoring a functional safety of a radar system according to an embodiment.

The method 50 for monitoring a functional safety of a radar system comprises receiving a baseband signal 51 having information on a distance of an object, filtering 52 the baseband signal with a Lead-Lag filter to generate a filtered signal and concluding 53 on safe operation conditions of the radar system, if a signal property of the filtered signal fulfills a predetermined criterion.

Functional safety is intrinsically end-to-end in scope safety concept, which tries to prevent harm to beings, nature and devices. A wrong distance measurement of the radar system may cause (severe) harm, so it is reasonable to prevent systematic errors, monitor sporadic errors and have a strategy for reaction in case of an error.

Therefore a conclusion if the radar system is working properly (in safe conditions) is made by monitoring signal parameters/properties of the filtered signal. These signals are compared with e.g. predetermined values or criterion to detect an error or misbehavior of the system.

The monitoring or evaluation of the signal may be done inside a monitoring unit, which may be located after the Lead-Lag filter, or even after an optional ADC. The monitoring unit may work either analog or digital.

By recognizing if the radar system misbehaves, it is possible to assure a maximum of safety or functional safety.

In an embodiment of the method, a reliability signal is provided, which reflects the functional safety of the radar system.

A reliability signal may be provided additional to the information or data from the radar measurement, which indicates, if the radar system is working properly. This signal may be digital in the simplest design, indicating with values of 0 and 1 its functioning. Other indications like a functioning likelihood may be used as well. The signal may be provided via a separate interface, e.g. a separate electrical connection or modulated together with other data or transmitted digitally via a bus.

By evaluating a reliability signal from the radar system, the systems, which are processing the data from the radar system may be warned or set to safe condition modes to be able to assure a maximum of safety or functional safety.

In an embodiment of the method, the predetermined criterion is fulfilled, if a DC component of the filtered signal does not exceed a threshold value.

A malfunction may be indicated, if the DC-component (suddenly) increases or jumps up. Then information or signals from the radar sensor or units before the evaluation unit are not reliable any more.

Therefore monitoring if the DC component does not exceed a predefined value, a threshold value may be advised. As long as the value (like the voltage or amplitude) of the DC component stays below the threshold, the predetermined criterion (definition of the threshold value) is fulfilled and the functional safety is determined to be assured.

Optionally, also a low threshold value may be used, i.e. if the parameter like the voltage does drop, the threshold may be exceeded.

In an embodiment of the method, the predetermined criterion is fulfilled, if a change of the DC component of the filtered signal per unit of time does not exceed a threshold value.

A malfunction may also be indicated, if the jump appears suddenly. If a unit or part like the Duplexer gets broken or malfunctions, this may be indicated this way.

Temperature shifts and other influences, which might affect the DC component in an orderly (i.e. non malfunctioning) manner, can probably not be monitored with a general threshold. Therefore in this example, an increase (or decrease) above (or below) the threshold is only counted as malfunction if it appears at a certain speed (e.g. suddenly or rapid). If the shift or deviation of the DC component is slow, i.e. the DC component does not exceed a threshold value within a defined unit of time, the predetermined criterion is fulfilled and the functional safety is determined to be assured.

In an embodiment of the method, the predetermined criterion is fulfilled, if the DC component does not deviate by more than 10% within 1 second.

Another example for configuring the monitoring is a relative threshold, not an absolute threshold value. Assuming that slow shifts in the monitored value are OK, the predetermined criterion may be fulfilled, if the deviation (of the DC-component) is less than 10%, 5% or 1% within a unit of time of 1 second, 0.1 seconds, 10 milliseconds or 1 millisecond.

In an embodiment of the method, the predetermined criterion is fulfilled, if cross-talking does not exceed a threshold value.

A typical malfunction is caused by cross-talking, what may e.g. occur between sender and receiver unit of the radar system. Because the sender is usually sending permanently, a part of the sending power reaches the receiving unit together with the received radar signal, which is superimposed that way. If the strength of the cross-talked component of the sending power drives the receiver into saturation, the weak received radar signal may not be detectable any more. Therefore separated sending and receiving antennas may be used.

Cross-talking may occur not only between a sending and receiving unit within a transceiving unit, but also between different transceiving units, especially if they are integrated on the same chip.

An integrated chip may comprise several parallel channels, where IF or baseband signals and receiving or carrier frequencies are routed. Therefore a high DC-component may indicate a high level of cross-talking. If the DC-component increases remarkably during operation, this may indicate strong cross-talking. This is an undesired behavior and may lead to the conclusion, that the measured values (like the distance) are not reliable any more.

Cross-talking may occur due to external influences like the appearing signal strength or e.g. broken units or parts. E.g. if the duplexer unit gets broken, this may lead to cross-talking.

If there are other means to measure cross-talking than monitoring the DC-component, which are more reliable, e.g. frequency analysis, it may be appropriate to define a suitable threshold value for the according parameter.

In an embodiment of the method, the filtered signal or an output signal of the radar system is set to safety values, in case the radar system does not work in safe operation conditions.

In case the radar system does not work reliable and the functional safety cannot be assured, safety values may be submitted to a user of the data of the radar system. For a distance measurement, these safety values may be a distance of several meters to show an in reality nonexistent danger by a close object, assuming, the evaluating system will take measures to avoid a collision (e.g. in an vehicle), by e.g. warning a driver, who will be alert about the malfunction if no close object is existent and he recognizes the wrong information from the radar and assumes a malfunction.

E.g. if no reliability signal or no interface for it is available and thus no notification about malfunctioning can be transmitted to the evaluating device, this procedure to set suitable safety values for the data from the radar system may be appropriate.

In an embodiment of the method, the reliability signal is compliant to ASIL or ASIL-D standard.

ASIL (automotive safety integrity level) is a key component of the standard ISO 26262. It has a procedure to analyze system functions and how to set them into relation with possible risks like exposure (how often do situations appear where a malfunction would have an impact), controllability (how likely can a malfunction be controlled) and severity (what is the impact if the situation cannot be controlled).

ASIL defines different risk groups "A" to "D", whereby each higher group has a ten times increased risk potential than the previous group. They show what might happen to the passengers and other persons involved.

Thus an applicable norm is available for the functional safety of road vehicles. It is proposed to monitor the functional safety features ASIL compliant to adapt to a standard and improve safe operation conditions. Adapting a standard of ASIL-D would allow the radar system to be used in safety critical applications.

Using parts which have a high security rating like ASIL-D, allows e.g. features like steering by wire. By omitting mechanical parts, less weight and less mechanically (moving) parts may be necessary.

Figure 5:
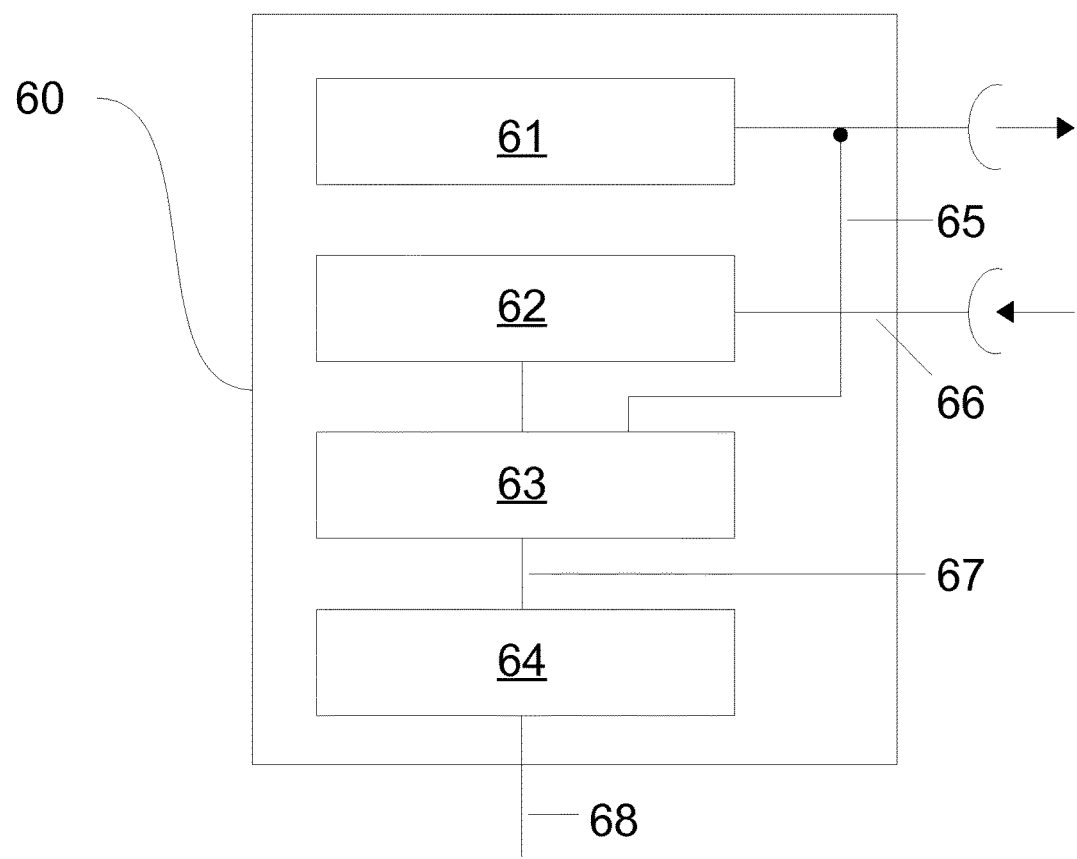
FIG. 5 shows a block diagram of a radar system.

FIG. 5 shows a block diagram of a radar system according to an embodiment.

The radar system 60 for a FMCW radar for measuring a distance of at least one object, comprising a sender 61 for generating a sent radar signal 65, a receiver 62 for receiving a reflected radar signal 66, a baseband signal generator 63, which generates a baseband signal 67 based on the sent radar signal 65 and the received radar signal 66 and a Lead-Lag filter 64, which filters the baseband signal 67 to generate a filtered signal 68.

A FMCW radar is suitable to determine the distance of objects. After mixing, the baseband signal indicates the distance by its frequency. The distance information thus can easily be derived.

Such a FMCW radar system may have a baseband with a reduced dynamic range and/or reduced peaks in the low frequency/DC component and the capability for functional safety monitoring.

In an embodiment the radar system is used or implemented in a vehicle.

The radar system may be used within vehicles, e.g. automobile vehicles, like cars, to perform distance measurements to other traffic participants or obstacles, which might influence the path and speed the vehicle goes. Therefore small and integrated systems may be preferred, which can easily be mounted within these vehicles at low costs. The proposed measures may lead to this goal, e.g. by integrating an appropriate filter (Lead-Lag filter), which allows easier amplifier design and easier signal evaluation or analog-digital conversion.

Further the proposed measures lead to improved functional safety which may be important especially within such (e.g. fast moving) vehicles.

Example embodiments may further provide a computer program having a program code for performing one of the above methods, when the computer program is executed on a computer or processor. A person of skill in the art would readily recognize that steps of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A radar signal device, comprising:
   a baseband signal generator, which generates a baseband signal based on an information from a received radar signal; and
   a Lead-Lag filter, which filters the baseband signal to generate a filtered signal.

2. The radar signal device according to claim 1, wherein the baseband signal generator generates the baseband signal by mixing an information based on a sent radar signal with the information from the received radar signal,
   whereby the received radar signal is the reflected radar signal of the sent radar signal.

3. The radar signal device according to claim 1, wherein a first corner frequency of the Lead-Lag filter is configured such that a signal amplitude is attenuated within 1% to 20% of a frequency range of the baseband signal.

4. The radar signal device according to claim 3, wherein a second corner frequency of the lead lag filter is within the Interval of 1% and 50% of the first corner frequency.

5. The radar signal device according to claim 4, wherein the Lead-Lag filter has a first corner frequency between 0.8 and 1.2 MHz and a second corner frequency or suppression frequency between 80 and 120 kHz.

6. The radar signal device according to claim 1, wherein the baseband signal is an analog electrical signal and the Lead-Lag filter is designed to filter the analog electrical signal.

7. The radar signal device according to claim 4, wherein the first corner frequency and the second corner frequency are adjustable.

8. The radar signal device according to claim 7, wherein the first corner frequency and the second corner frequency are adjusted based on a property of the filtered signal.

9. The radar signal device according to claim 1, further comprising an amplifier configured to amplify the filtered signal.

10. The radar signal device according to claim 9, wherein the amplification is at least 18 dB.

11. A method, comprising:
    receiving a baseband signal having information on a distance of an object;
    filtering the baseband signal using a Lead-Lag-filter to generate a filtered signal; and
    determining whether safe operation conditions of a radar system exist based on whether a signal property of a DC component of the filtered signal fulfills a predetermined condition.

12. The method according to claim 11, wherein safe operation conditions are determined if the DC component of the filtered signal does not exceed a threshold value.

13. The method according to claim 11, wherein safe operation conditions are determined if a change of the DC component of the filtered signal per unit of time does not exceed a threshold value.

14. The method according to claim 11, wherein safe operation conditions are determined if the DC component does not deviate by more than 10% within 1 second.

15. The method according to claim 11, wherein safe operation conditions are determined based on a measurement of a cross-talking parameter, wherein the cross-talking parameter does not exceed a threshold value.

16. The method according to claim 11, wherein a reliability signal is provided which reflects a functional safety of the radar system, wherein the functional safety is compliant to the ISO26262 (ASIL or ASIL-D) standard.

17. A radar system for a FMCW radar, comprising:
   a transmitter configured to generate a sent radar signal;
   a receiver configured to receive a reflected radar signal;
   a baseband signal generator, configured to generate a baseband signal based on the sent radar signal and the received radar signal; and
   a Lead-Lag filter, which filters the baseband signal to generate a filtered signal.

18. The radar system according to claim 17, wherein the radar system is implemented in a vehicle.

* * * * *